United States Patent [19]
Dillon et al.

[11] Patent Number: 4,945,125
[45] Date of Patent: Jul. 31, 1990

[54] PROCESS OF PRODUCING A FIBRILLATED SEMI-INTERPENETRATING POLYMER NETWORK OF POLYTETRAFLUOROETHYLENE AND SILICONE ELASTOMER AND SHAPED PRODUCTS THEREOF

[75] Inventors: Joseph A. Dillon; Mark E. Dillon, both of Huntingdon Valley, Pa.

[73] Assignee: Tetratec Corporation, Feasterville, Pa.

[21] Appl. No.: 389

[22] Filed: Jan. 5, 1987

[51] Int. Cl.$^5$ .................. C08L 27/18; D01D 5/16; D01F 1/02

[52] U.S. Cl. .................. 527/427; 264/127; 264/210.2; 264/211.24; 264/DIG. 47; 525/104

[58] Field of Search ....... 525/104; 264/127, DIG. 47, 264/210.2, 211.24

[56] References Cited

U.S. PATENT DOCUMENTS

| | | | |
|---|---|---|---|
| 2,710,290 | 6/1955 | Safford et al. | 525/104 |
| 2,927,908 | 3/1960 | Kondle et al. | 525/104 |
| 3,278,673 | 10/1966 | Gore | 174/120 |
| 3,293,203 | 12/1966 | Paulus | 524/535 |
| 3,315,020 | 4/1967 | Gore | 264/147 |
| 3,325,434 | 6/1967 | Tully | 264/127 |
| 3,382,305 | 5/1968 | Breen | 264/171 |
| 3,528,879 | 9/1970 | Kometani et al. | 162/157 |
| 4,042,747 | 8/1977 | Breton et al. | 428/323 |
| 4,153,661 | 5/1979 | Ree et al. | 264/120 |
| 4,183,887 | 1/1980 | Karg | 264/130 |
| 4,194,040 | 3/1980 | Breton et al. | 428/308 |
| 4,482,516 | 11/1984 | Bowman et al. | 264/127 |
| 4,500,688 | 2/1985 | Arkles | 525/431 |
| 4,596,839 | 6/1986 | Peters | 523/175 |
| 4,764,560 | 8/1988 | Mitchell | 524/506 |

Primary Examiner—Wilbert J. Briggs, Sr.
Attorney, Agent, or Firm—Paul & Paul

[57] ABSTRACT

A process for producing a semi-interpenetrating polymer network of polytetrafluoroethylene and silicone elastomers is described which comprises the steps of (1) intimately blending a mixture of a major amount of unsintered and unfibrillated particulate polytetrafluoroethylene dispersion resin and minor amounts of (A) a hydrocarbon liquid and (B) an addition curable silicone composition consisting essentially of a polydiorganosiloxane having alkenyl unsaturation, an organohydrogenpoly-siloxane crosslinking agent, a catalyst for promoting crosslinking of said polysiloxane, and an inhibitor for the catalytic reaction; (2) forming said blend into an extrudable shape; (3) biaxially extruding said blend through a die into a shaped extrudate product having a randomly fibrillated structure; (4) evaporating said hydrocarbon liquid, and activating said catalyst so as to generate a cured silicone elastomer and polytetrafluoroethylene semi-interpenetrating polymer network comprising said fibrillated extrudate structure. Products produced by this process have improved physical properties as compared to extruded fibrillated polytetrafluoroethylene dispersion resin alone.

5 Claims, 1 Drawing Sheet

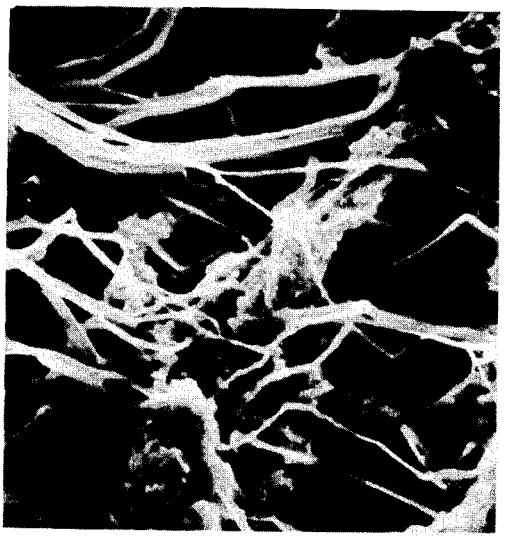

PROCESS OF PRODUCING A FIBRILLATED SEMI-INTERPENETRATING POLYMER NETWORK OF POLYTETRAFLUOROETHYLENE AND SILICONE ELASTOMER AND SHAPED PRODUCTS THEREOF

FIELD OF THE INVENTION

The invention relates to novel compositions comprising semi-interpenetrating polymer networks of polytetrafluoroethylene and silicone elastomers, a process for making such compositions, and shaped products formed from such compositions. More particularly, it relates to the compositions produced by (1) intimately blending a mixture of a major amount of unsintered and unfibrillated particulate polytetrafluoroethylene dispersion resin and minor amounts of (A) a hydrocarbon liquid and (B) an addition curable silicone composition consisting essentially of a polydiorganosiloxane having alkenyl unsaturation, an organohydrogenpolysiloxane crosslinking agent, a catalyst for promoting crosslinking of said polysiloxane, and an inhibitor for the catalytic reaction; (2) forming said blend into an extrudable shape; (3) biaxially extruding said blend through a die into a shaped product having a randomly fibrillated structure; (4) evaporating said hydrocarbon liquid, and activating said catalyst so as to generate a cured silicone elastomer and polytetrafluoroethylene semi-interpenetrating polymer network comprising said fibrillated structure.

DESCRIPTION OF THE PRIOR ART

In U.S. Pat. No. 3,315,020, the disclosure of which is incorporated herein by reference, there is disclosed a process for preparing sheet-like articles of biaxially fibrillated polytetrafluoroethylene which, though in the unsintered state, have high elongation and strength in all directions in the major plane of the sheet. In this process, a relatively large cylinder of compacted unfibrillated dispersion grade polytetrafluoroethylene (PTFE) particles is passed through a die having two orifices in series. The first orifice is a round, square or rectangular orifice and the second orifice is a long slit-shaped orifice. This extrusion of particulate PTFE is aided by the pre-blending with the compacted particles of an organic fluid lubricant such as for example kerosene, VM&P naptha and Isobars. The resultant extrusion produces a continuous sheet of biaxially oriented fibrillated structure of PTFE partially saturated with volatile organic liquid. Under certain processing conditions, the hydrocarbon is evaporated before further processing of the PTFE sheet, such as sintering. For the purposes of this invention, biaxial fibrillation refers to the extrusion method disclosed in U.S. Pat. No. 3,315,020. Although unsintered (i.e. not having been heated to above 327° C.), PTFE dispersion grade resin is highly crystalline (approx. 95%) and has a very high melt viscosity, when heated to temperatures above 327° C., some of the PTFE crystallites deform, thereby increasing the amorphous content of the polymer. Such heating and subsequent cooling of the polymer to temperatures below 327° C. produces sintered PTFE. The sintering of shaped unsintered PTFE structures while maintaining the shape produces a thermosetting effect upon the polymer, thus enabling shape retention.

In the process of biaxial fibrillation of dispersion grade PTFE resin, lower extrusion pressures are desirable for economic as well as qualitative reasons. The configurations of the die, the ratio of crossectional preform area to die orifice area (reduction ratio), extrusion speed and the amount of lubricant determine the pressure necessary to force a given PTFE resin through a die. However, the obvious approach of achieving lower pressures by over lubrication is detrimental. The extruded material may become overly oriented in the machine direction and suffer a significant loss in transverse direction strength. Also, when excessive lubricant is evaporated, voids are created without leaving any remaining structure having orientation, thereby causing loss of strength. Perhaps the most significant problem of over lubrication is merely the softness of the extrusion that occurs, thereby severely restricting further processing, such as calendering and stretching.

Calendering of continuous biaxially fibrillated PTFE extrudate is usually accomplished while the extrudate still contains the hydrocarbon lubricant, and involves compression between rolls spaced apart by a predetermined distance and consequent elongation. Normally, the extrudate is then heated to a temperature at which the hydrocarbon lubricant will be safely evaporated in a reasonable period of time. In the manufacture of pipe-thread sealant, further orientation of the extrudate is accomplished by linear stretching using differential speed rollers on the dried material or on material still containing hydrocarbon lubricant. In the production of micro-porous PTFE membranes, linearly oriented extrudate of the biaxial fibrillation process is given further transverse orientation by use of equipment such as tenter frames or the like. The membranes thus produced are normally heated to above 327° C. and subsequently cooled to effect sintering.

In the prior art processes of modifying the characteristics of biaxially fibrillated PTFE extrudate, difficulties arise in attempts to produce uniform extrudate having satisfactory orientation of fibrillated material to facilitate adequate transverse stretching. One reason for this difficulty is the low transverse elongation inherent in linearly oriented material. Examples of these difficulties are found in U.S. Pat. No. 4,187,390.

BRIEF SUMMARY OF THE INVENTION

We have unexpectedly discovered that the prior art process of biaxial fibrillation of PTFE may be modified so as to produce novel products comprising a biaxially fibrillated semi-interpenetrating polymer network of PTFE and cured silicone elastomers having increased strength and uniformity. Such products facilitate the production of stretched and sintered end products having functions comparable to those of microporous PTFE tape and film. The products of this invention have distinctly different properties than the starting materials from which they are formulated.

BRIEF DESCRIPTION OF THE DRAWING

The drawing is a scanning electron microphotograph of a shaped product produced by the process of this invention.

DETAILED DESCRIPTION OF THE INVENTION

The first step in the process of this invention is to intimately blend a mixture of a major amount of unsintered and unfibrillated particulate PTFE dispersion resin and minor amounts of (A) a hydrocarbon liquid and (B) an addition curable silicone composition consisting essentially of a polydiorganosiloxane having alkenyl unsaturation, an organohydrogenpolysiloxane cross linking agent, a catalyst for promoting crosslinking of said polysiloxane, and an inhibitor for the catalytic reaction. The mixture is necessarily blended by means of a liquid-solids blender or by jar tumbling to avoid any substantial shearing of the PTFE dispersion resin.

Suitable unsintered and unfibrillated PTFE dispersion resin is manufactured by E. I. du Pont de Nemours & Co., Inc. under the designations TEFLON® 6 and 6C; and by Imperial Chemical Industries as FLUON®CD1, CD123 and CD525.

Alkenyl-containing polydiorganosiloxanes typically employed in the practice of the present invention can have viscosities up to 100,000,000 centipoise or more at 25° C., for example, in accordance with the teaching of U.S. Pat. No. 4,061,609 to Bobear. It has been found that excellent results are obtained when the viscosity of the alkenyl-containing polysiloxane is from about 500 centipoise to 50,000 centipoise at 25° C., and especially when the viscosity is from about 3000 centipoise to 6000 centipoise at 25° C.

Organohydrogenpolysiloxanes that can be utilized in the present invention may be linear or resinous and have viscosities of between about 25 centipoise and 10,000 centipoise at 25° C., with the preferred range being from about 100 centipoise to about 1000 centipoise at 25° C.

The curing catalyst can be either an organic peroxide or a precious metal containing material. Suitable organic peroxides include dibenzoyl peroxide, bis-2,4-dichlorobenzol peroxide, di-t-butyl peroxide, 2,5-dimethyl-2,5-di(t-butylperoxy) hexane, and dicumyl peroxide. Precious metal containing catalysts can be based on the metals rhodium, ruthenium, palladium, osmium, irridium and platinum. It is particularly preferred that a platinum metal complex be employed as the catalyst, for example, as taught by Ashby in U.S. Pat. Nos. 3,159,601 and 3,159,662, Lamoreaux in U.S. Pat. No. 3,220,970, Karstedt in U.S. Pat. No. 3,814,730, and Modic in U.S. Pat. No. 3,516,946.

In an especially preferred embodiment, the addition curable silicone composition further includes a reinforcing organopolysiloxane resin of the type disclosed in U.S. Pat. No. 3,284,406 to Nelson or U.S. Pat. No. 3,436,366 to Modic. Briefly, such resins are copolymers of $SiO_2$ units, $(CH_3)_3SiO_{0.5}$ units and $(CH_3)_2=CH)SiO_{0.5}$ units, and $SiO_2$ units, $(CH_3)_3SiO_{0.5}$ units and $(CH_3)(CH_2=CH)SiO$ units, respectively. Particularly preferred organopolysiloxane resins are MDQ resins having vinyl unsaturation on monofunctional siloxane units, difunctional siloxane units, or both. The use of such reinforcing organopolysiloxane resins is especially desirable when the viscosity of the alkenyl containing polydiorganosiloxane is less than about 5000 centipoise at 25° C.

It is also contemplated that there may be included any conventional extending and/or reinforcing fillers. Fumed silica has been found to be particularly effective as a reinforcing filler.

In another particularly preferred embodiment of the present invention, the addition curable silicone composition also contains a silane or polysiloxane which functions both as an inhibitor and as an adhesion promoter. One such composition is described in U.S. Pat. No. 3,759,968 to Berger et al. as a maleate or fumarate function silane or polysiloxane. Compositions effective only as an inhibitor are disclosed in U.S. Pat. No. 4,256,870 to Eckberg and 4,061,609 to Bobear. Other suitable inhibitors will be obvious to those skilled in the art.

It is further contemplated that the silicone can be a condensation curable silicone composition. Generally, condensation curable silicone compositions are available in either one or two packages and comprise (1) a polydiorganosiloxane having terminal hydrolyzable groups, e.g., hydroxyl or alkoxyl, and (2) a catalyst which promotes condensation curing. Such compositions are well known in the art, for example, as described in U.S. Pat. No. 3,888,815 to Bessmer et al.

Alternatively, the polysiloxane network can be prepared by the hydrolytic polycondensation of silanes having the general formula

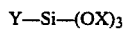

where each X is independently selected from the group consisting of hydrogen, alkyl radicals, hydroxyalkyl radicals, alkoxyalkyl radicals, and hydroxyalkoxyalkyl radicals, and Y is an alkyl radical, OX, where X is as previously defined, or an amino or substituted amino radical. The use of silanes having hydrolyzable groups to form a polysiloxane network of an inter-penetrating polymer network is discussed in greater detail in U.S. Pat. No. 4,250,074 to Foscante et al.

The hydrocarbon liquid may suitably be a solvent such as VM&P naptha, Isobars and kerosene.

The minor amounts of hydrocarbon liquid and addition curable silicone composition both function in the first step of the process of this invention as a lubricant for the PTFE particles, and therefore care must be used to avoid the known problem of over lubrication. However, when amounts as small as 2% by weight of addition curable silicone composition are incorporated in the blend, extrusion pressures are caused to be lower than in the case of a blend of hydrocarbon liquid and PTFE dispersion resin alone. At the level of 7% by weight incorporation of addition curable silicone composition into the blend, extrusion pressures have been reduced as much as 56%.

In the second step of the process of this invention, the blend is compacted into a preform shape adapted to the configuration necessary for the process of biaxial fibrillation as described in U.S. Pat. No. 3,315,020.

In the third step of the process of this invention, paste extrusion of the preformed blend is carried out in the known manner of biaxial fibrillation as described in U.S. Pat. No. 3,315,020.

In the fourth step of the process of this invention, the hydrocarbon liquid contained in the blend is evaporated, and simultaneously therewith or later the catalyst for the siloxane crosslinking reaction is activated thereby generating a cured silicone elastomer and polytetrafluoroethylene semi-interpenetrating polymer network in the form of the biaxially fibrillated extrudate.

EXAMPLE 1

The following curable silicone composition is prepared.

|  | Parts by Weight |
|---|---|
| Vinyl N-stopped polydimethylsiloxane (3500 cps at 25° C.) | 68.2 |
| MDQ silicone resin blend | 22.7 |
| Dimethyl vinylsiloxane resin blend | 8.2 |
| bis (trimethoxysilylpropyl) maleate | 0.9 |

-continued

| | Parts by Weight |
|---|---|
| Lamoreaux platinum catalyst | 10 p.p.m. |

This curable silicone composition was combined with FLUON®CD123 grade polytetrafluoroethylene dispersion resin and VM&P naptha as follows:

Five silicone/VM&P naptha/PTFE dispersion grade resin blends and one VM&P naptha/PTFE blend were prepared using a liquid-solids blender. The resultant blends were compacted into cylindrical preforms and extruded through a die having a circular orifice and a reduction ratio of 900:1. The resultant bead extrudates required the extrusion pressures shown in Table 1. It can be seen from Table 1 that extrusion pressure is substantially decreased by the addition of a small amount of the curable silicone polymer, yet all of the extrudate samples appeared to be the same to the eye and had the normal feel of PTFE dispersion grade resin extrusions. Samples 5 and 6 show an increase in extrusion pressure when compared to Samples 2 and 3, respectively, due to a reduction in organic lubricant content.

EXAMPLE 2

Three kerosene/PTFE dispersion grade resin blends and four silicone/kerosene/PTFE dispersion grade resin blends were prepared using a liquid-solids blender and the silicone composition and PTFE resin of Example 1. The resultant blends were compacted into cylindrical preforms and extruded through a die constructed to achieve biaxial fibrillation as described in U.S. Pat. No. 3,315,020. The extrudates of Samples 2-1, 2-2, 2-3 and 2-4 were calendered to 5 mil thicknesses and samples 2-5, 2-6 and 2-7 were calendered to 4 mil thicknesses. Each extrudate was heated at between 310° F. and 320° F. to evaporate the kerosene and to cure the silicone elastomer. The extrusion conditions and physical properties of the extrudates are shown in Table 2. By comparing Sample Nos. 2-1, 2-2 and 2-5 with Sample Nos. 2-3, 2-4 and 2-7, it can be seen that the density of the extrudates incorporating silicone elastomer was increased by as much as 28% over that of the comparable PTFE extrudate. It can also be seen that incorporation of silicone elastomer in the biaxially fibrillated extrudates improved the transverse elongation before break property as much as 37.5% of the value without silicone elastomer incorporation.

EXAMPLE 3

The extrudates obtained according to Example 2 were transversely stretched using a tenter frame. The samples incorporating silicone elastomer were heated at about 120° C. during stretching while the PTFE extrudates were heated at 175° C. during stretching. Physical properties of the resultant microporous films obtained are shown in Table 3. It can be seen in each case that the incorporation of silicone elastomer increased tensile strengths of the stretched products in both machine direction and transverse direction. A scanning electron micro-photograph of stretched Sample 2-3 was taken at 5,000X magnification and is shown in the drawing. The random fibrillations shown have thicknesses as large as 1.0 micron.

TABLE 2

| Extrusion No. | PTFE (g.) | Silicone (g.) | Kerosene (g.) | extrusion pressure (psi) | linear stretch ratio | density (g/cc) | transverse direction tensile strength (psi) | T.D. elongation (%) |
|---|---|---|---|---|---|---|---|---|
| | | | Reduction ratio = 12.3:1 Extrusion width = 8 inches | | | | | |
| 2-1 | 3178 | 0 | 619.2 | 4000 | 1:1 | 1.57 | 367 | 1000 |
| 2-2 | 3178 | 0 | 619.2 | 4000 | 1.84:1 | 1.03 | 233 | 1400 |
| 2-3 | 2955.5 | 222.5 | 590.3 | 4600 | 1.1 | 1.69 | 440 | 1150 |
| 2-4 | 2955.5 | 222.5 | 540.3 | 4600 | 1.84:1 | 1.32 | 293 | 1350 |
| | | | Reduction ratio = 8.18:1 Extrusion width = 12 inches | | | | | |
| 2-5 | 3178 | 0 | 826.3 | 2600 | 1.84:1 | 1.05 | 192 | 800 |
| 2-6 | 2955.5 | 222.5 | 730.9 | 2600 | 1:1 | 1.74 | 390 | 900 |
| 2-7 | 2955.5 | 222.5 | 730.9 | 2600 | 1.84:1 | 1.31 | 259 | 1100 |

TABLE 1

| Sample No. | PTFE (g.) | Silicone (g.) | VM & P naptha (g.) | Extrusion Pressure (psi) |
|---|---|---|---|---|
| 1-1 | 3178 | 0 | 699.2 | 8,750 |
| 1-2 | 3114.4 | 63.6 | 699.2 | 7,110 |
| 1-3 | 3019.1 | 158.9 | 699.2 | 5,770 |
| 1-4 | 2955.5 | 222.5 | 699.2 | 3,800 |
| 1-5 | 3114.4 | 63.6 | 607.0 | 11,700 |
| 1-6 | 3019.1 | 158.9 | 562.5 | 7.520 |

TABLE 3

| Sample No. | Extrusion No. | % Silicone | Linear Stretch Ratio | Transverse Stretch (%) | Tensile Strength (psi) Transverse Direction | Tensile Strength (psi) Machine Direction |
|---|---|---|---|---|---|---|
| 3-1 | 2-1 | 0 | 1.1 | 1278 | 1260 | 685 |
| 3-2 | 2-2 | 0 | 1.84:1 | 1278 | 1830 | 1480 |
| 3-3 | 2-2 | 0 | 1.84:1 | 1544 | 1300 | 889 |
| 3-4 | 2-3 | 7 | 1.1 | 1278 | 1890 | 986 |
| 3-5 | 2-3 | 7 | 1.1 | 1767 | 1550 | 914 |
| 3-6 | 2-4 | 7 | 1.84:1 | 1278 | 2180 | 2110 |
| 3-7 | 2-4 | 7 | 1.84:1 | 1544 | 1980 | 1710 |
| 3-8 | 2-5 | 0 | 1.84:1 | 825 | 919 | 1100 |
| 3-9 | 2-6 | 7 | 1.84:1 | 825 | 1940 | 720 |
| 3-10 | 2-7 | 7 | 1.1 | 675 | 1740 | 2850 |
| 3-11 | 2-7 | 7 | 1.84:1 | 825 | 1590 | 1700 |

EXAMPLE 4

Five portions of the microporous film Sample No. 3-6, produced in accordance with Example 3, were sprayed continuously for 15 seconds with a low-odor kerosene solution of the curable silicone composition set forth in Example 1 at increasing silicone concentrations (2.5%, 5.0%, 10.0%, 15.0%, 20.0%). After spraying and evaporation of the solvent, the samples were cured at 150° C. for 15 minutes. Table 4 shows the surprising effect of this cured silicone elastomer impregnation of microporous film products formed from the polymer network compositions of this invention on the opacity of the film as compared to the untreated film. Other physical characteristics of these products are likewise shown in Table 4.

TABLE 4

| Sample No. | % solution sprayed | amount deposited (mg/cm$^2$) | thickness (mil) | density (g/cc) | hydro-static resist-ance (psi) | vapor trans-mission (g/m$^2$/24 hrs) | moisture Tappi opacity (%) | Gurley number (seconds) |
|---|---|---|---|---|---|---|---|---|
| 3-6 | — | — | 1.3 | 0.33 | 77 | 701 | 73.8 | 6 |
| 4-1 | 2.5 | 0.11 | 0.5 | 0.95 | 82 | 736 | 49.0 | 44 |
| 4-2 | 5 | 0.26 | 0.5 | 1.07 | 82 | 755 | 50.1 | 64 |
| 4-3 | 10 | 0.33 | 0.4 | 1.13 | 84 | 764 | 36.7 | 90 |
| 4-4 | 15 | 0.38 | 0.5 | 1.17 | 91 | 720 | 35.3 | 116 |
| 4-5 | 20 | 0.70 | 0.6 | 1.18 | 125 | 638 | 16.8 | 1128 |

Example 5
The following ingredients were blended together using a liquid-solids blender:

| 238.4 g | Silicone composition of Example 1 |
| 238.4 g | Calcium carbonate |
| 2701.3 g | PTFE dispersion grade resin |
| 730.9 g | Kerosene |

The resultant blend was then compacted into cylindrical preforms and extruded through the die utilized in the extrusion of Samples 2-1 through 2-4. An extrusion pressure of 3,000 psi was observed. The extrudate was calendered to a 5 mil thickness and then heated at between 310° F. and 320° F. to evaporate the kerosene and to cure the silicone elastomer. It is apparent from this example that the process of this invention can be utilized to produce filled semi-interpenetrating polymer networks of PTFE and silicone elastomers.

Having thus described our invention, we claim:

1. A process for producing a semi-interpenetrating polymer network of polytetrafluoroethylene and silicone elastomers which comprises the steps of (1) intimately blending a mixture of a major amount of unsintered and unfibrillated particulate polytetrafluoroethylene dispersion resin and minor amounts of (A) a hydrocarbon liquid and (B) an addition curable silicone composition consisting essentially of a polydiorganosiloxane having alkenyl unsaturation, an organohydrogenpolysiloxane crosslinking agent, a catalyst for promoting crosslinking of said polysiloxane, and an inhibitor for the catalytic reaction; (2) forming said blend into an extrudable shape; (3) biaxially extruding said blend through a die into a shaped extrudate product having a randomly fibrillated structure; (4) evaporating said hydrocarbon liquid, and activating said catalyst so as to generate a cured silicone elastomer and polytetrafluoroethylene semi-interpenetrating polymer network comprising said fibrillated extrudate structure.

2. The process of claim 1 further characterized by calendering the shaped extrudate product to a uniform thickness.

3. The process of claim 1 wherein the amount of addition curable silicone composition constitutes at least two percent by weight of the mixture of polytetrafluoroethylene, hydrocarbon liquid and addition curable silicone composition.

4. The process of claim 1, wherein the mixture of step (1) includes additionally a minor amount of calcium carbonate.

5. The product of the process of claim 1.

* * * * *